United States Patent [19]

Lautzenhiser

[11] 4,445,371
[45] May 1, 1984

[54] GRAVITY METER AND METHOD

[75] Inventor: Theodore V. Lautzenhiser, Tulsa, Okla.

[73] Assignee: Standard Oil Company (Indiana), Chicago, Ill.

[21] Appl. No.: 373,327

[22] Filed: Apr. 30, 1982

[51] Int. Cl.³ .............................................. G01V 7/00
[52] U.S. Cl. ............................... 73/382 R; 73/DIG. 1; 331/65
[58] Field of Search .............. 73/382, 517 R, 517 AV, 73/DIG. 1; 331/65

[56] References Cited

U.S. PATENT DOCUMENTS

| | | | |
|---|---|---|---|
| 2,559,919 | 7/1951 | Gustafsson | 73/382 |
| 3,100,292 | 8/1963 | Warner et al. | 73/517 R |
| 3,472,076 | 10/1969 | Howell et al. | 73/382 |
| 4,257,010 | 3/1981 | Bergman et al. | 331/65 |

Primary Examiner—Gerald Goldberg
Assistant Examiner—John E. Chapman, Jr.

[57] ABSTRACT

Measurements of the gravitational field are made by generating a frequency representative of the gravitational field. In one aspect, the frequency is generated by oscillations in a magnetic vibrator formed by magnets having vertically opposed magnetic poles.

10 Claims, 4 Drawing Figures

GRAVITY METER AND METHOD

FIELD OF THE INVENTION

The invention relates to gravity meters. In one particular aspect, the invention relates to gravity meters for use in a borehole or other remote location.

BACKGROUND OF THE INVENTION

Gravity meters suitable for use in boreholes and at other remote locations must meet requirements of ruggedness, accuracy, small size, and temperature stability.

A form of gravity meter heretofore used is described in U.S. Pat. No. 3,472,076 (1969) and employs an electrically conductive vibrating string having a mass fastened to its lower ends as a sensitive element. The vibrating string is suspended in the field of a magnet and vibrates at a natural frequency which changes as the attraction of gravity on the mass changes. The vibrating string gravity meter, such as described in the above patent, has excellent size and temperature characteristics but can be limited by characteristics of the vibrating string used as the sensitive element. Thus, for example, only one mode of oscillation in the string is desirable, but this is hard to achieve. Similarly, the string itself typically has temperature coefficient characteristics which can cause variations due to changes in ambient temperature. Likewise, over time the base frequency may change in steps, a phenomenon which may be the result of displacement slippage of, for example, the tungsten crystals of a vibrating string.

SUMMARY OF THE INVENTION

According to the invention, there is provided method and apparatus for measuring the gravitational field comprising maintaining oscillation at a natural frequency of a magnetic vibrator formed by magnets having vertically opposed magnetic poles and generating a signal correlated to the natural frequency. The invention will be clearer from the following detailed description and the drawings in which.

DESCRIPTION OF THE INVENTION

Figure 1:
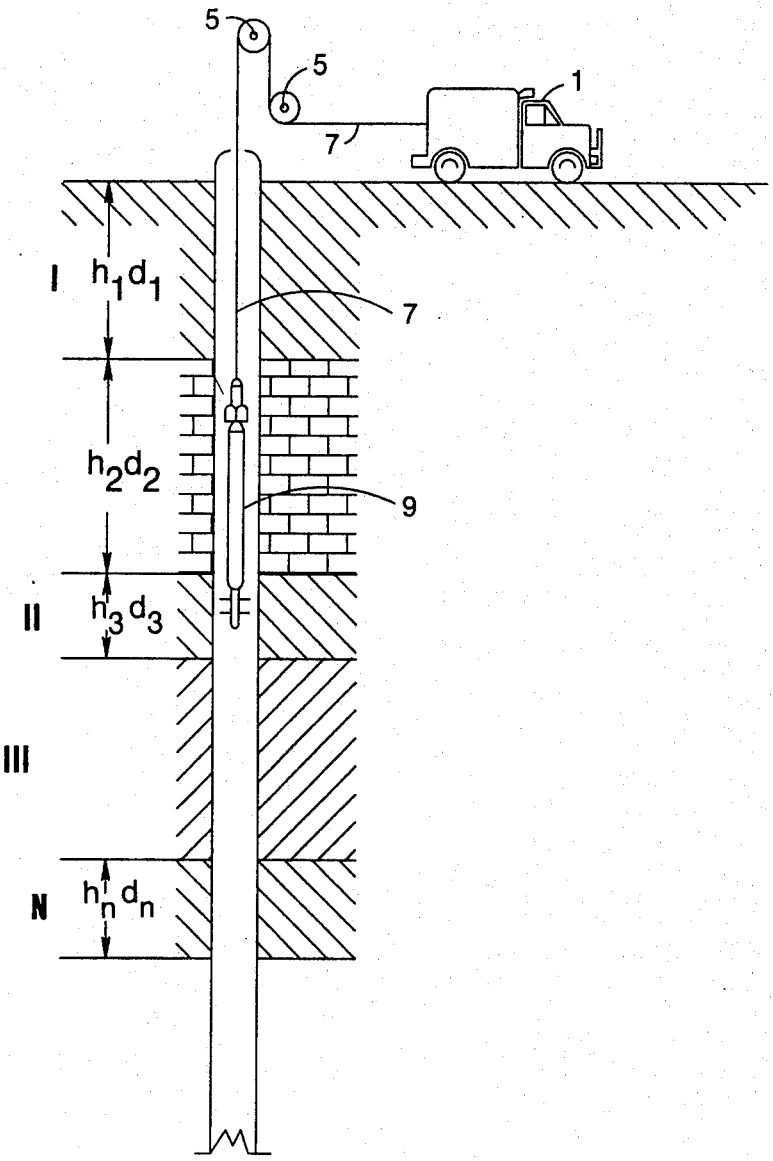
FIG. 1 illustrates a well logging operation in the earth using the invention.

Referring now to FIG. 1, there is shown in schematic form apparatus for making gravity measurements in a borehole in accordance with the invention. A conventional logging truck 1 at the earth's surface controls a gravity sonde 9 which is lowered into a borehole on a logging cable 7 by sheaves 5 suspended over the borehole. The cable 7 may be a multiconductor cable such as is conventionally used for electrical well logging purposes. The sonde 9 while being lowered through the borehole traverses a number of earth formations designated by numerals I, II, III, . . . N, each of which has a different density designated by $d_1$, $d_2$, $d_3$, . . . $d_n$. The thicknesses of the respective formations are designated $h_1$, $h_2$, $h_3$ . . . $h_n$. If it is desired to determine the density $d_2$ of layer II, for example, gravity measurements in accordance with the invention can be taken, for example, at the top and at the base of layer II, and the density of the layer can be determined from the formula:

$$\Delta g = 4\pi K h_2 d_2 - h_2 (0.9406 \times 10^4)$$

The relationship itself is well known and will not be further discussed herein.

Figure 2:
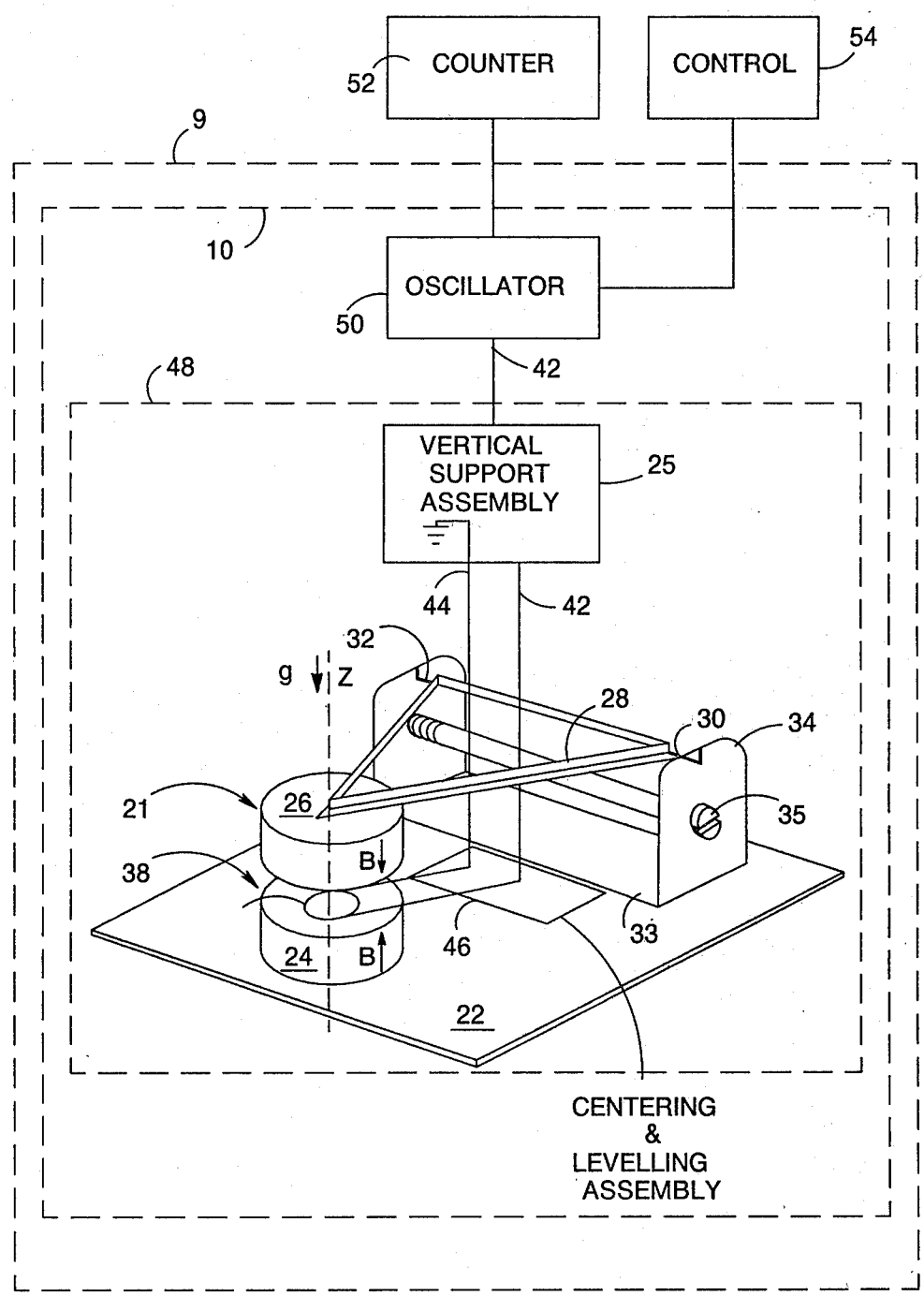
FIG. 2 illustrates certain functional and structural aspects of a preferred embodiment of the invention.

Referring now to FIG. 2, FIG. 2 illustrates certain functional and structural aspects of the invention. Reference numeral 21 designates generally a magnetic vibrator according to the invention. Magnetic vibrator 21 comprises a platform 22 on which a first magnet 24 having a generally dipolar magnetic field is mounted. A second magnet 26 is mounted on a triangular frame 28 and pivots on hinge wire 30 attached between supports 32 and 34 of bracket 33. The tension on hinge wire 30 can be adjusted by tension adjustment means 35 for adjusting and maintaining tension on the hinge wire 30 so that the movable magnet 26 has essentially only one degree of freedom.

Each of first and second magnets 24 and 26 are preferably generally dipolar high energy disk magnets having a vertical axis substantially aligned as illustrated and as hereinafter described with the vertical gravity field g. Each of first and second magnets 24 and 26 has a corresponding pole opposed, as indicated by symbols B and associated arrows, to a corresponding pole of the other magnet, for example, north pole to north pole, or south pole to south pole to establish a magnetic field formed by opposing magnetic poles between first magnet 24 and second magnet 26. Preferably, the thus-formed magnetic field effects a distance 38 between first magnet 24 and second magnet 26. Changes in gravity g will effect movement of second magnet 26 relative to first magnet 24 varying the distance 38 and causing changes in magnetic flux in the magnetic field formed between the magnets. Thus, although for purposes of description herein, changes in gravity are spoken of as being related to changes in the magnetic field between the magnets, it is apparent that changes in the variable distance 38 correlate with such changes in the magnetic field. Particularly preferred for magnets 24 and 26 are high energy disk rare earth magnets having a substantially zero temperature coefficient of expansion below about 200° C. since such magnets are particularly well suited to borehole logging.

The magnetic vibrator 21 has a natural frequency of oscillation dependent upon gravity g as described in the VERIFICATION below and, according to the invention, a signal is generated correlated to the natural frequency of oscillation to provide a measure of gravity g.

A number of techniques are available for causing the magnetic vibrator 21 to vibrate so that the magnetic field between magnets 24 and 26 oscillates at a natural frequency. According to the illustrated preferred embodiment a coil 40 is placed in the space 38 between first magnet 24 and second magnet 26 with the perpendicular of the coil preferably coaxial with the vertical axis z of the magnets. The coil 40 is supported on platform 22 and preferably the leads 42 and 44 can be employed to vertically suspend the platform 22 from vertical support assembly 25. Centering and leveling assembly 46 is mounted on platform 22 for centering and leveling platform 22 for maintaining the axis z of first magnet 24 and second magnet 26 substantially vertical. Such leveling and centering assemblies are well known and will not be further described here; one such assembly, for example, is described in U.S. Pat. No. 3,472,076.

Electrical lead 42 from the coil 40 is provided as an input to oscillator 50 which under control of control 54 functions for damping or enhancing oscillations of the magnetic field between magnets 24 and 26 as hereinbelow described in more detail. Oscillator 50 also has an output to counter 52 for counting the frequency of oscillator 50.

At least the vertical support assembly and magnetic vibrator 21 are preferably mounted in a vacuum housing indicated by dotted line 48. Mounting in a vacuum housing reduces gas damping of the system and enhances the Q of the mechanical system. Preferably, the oscillator 50, vertical support assembly 25, and magnetic vibrator 21 are enclosed in a temperature control oven, indicated by dashed line 10, and for borehole work the entire assembly can be enclosed in a gravity sonde indicated by dashed line 9 for lowering into a borehole as illustrated in FIG. 1. Preferably, the vacuum housing 48 can also function as a magnetic shield or such can be separately provided in fixed spatial relation to magnetic vibrator 21. Counter 52 and Control 54 are preferably positioned above ground during well logging for convenience of operation.

Figure 3:
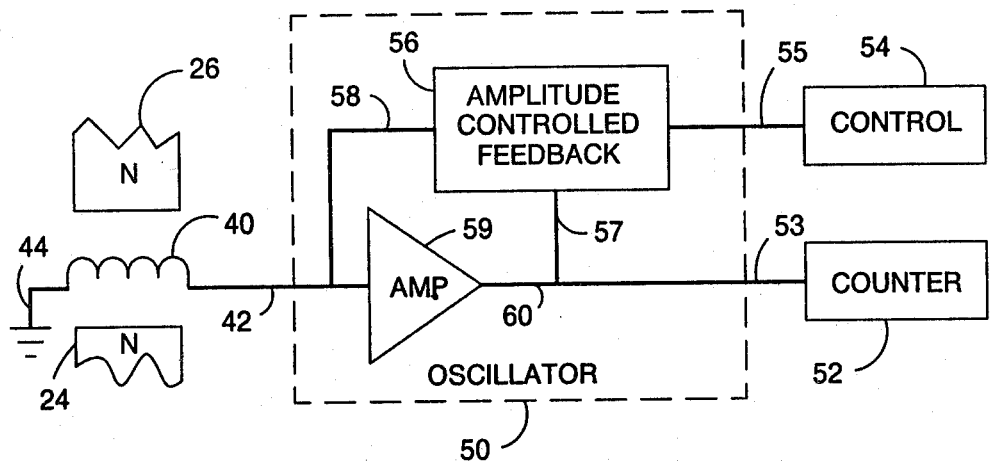
FIG. 3 illustrates schematically the embodiment of FIG. 2.

Referring now to FIG. 3, FIG. 3 illustrates schematically the embodiment of FIG. 2. As illustrated, coil 40 is positioned intermediate, for example, the opposed north poles of magnets 24 and 26. One side of coil 40 is electrically grounded by lead 44 while the other side of coil 40 is provided by lead 42 to oscillator 50 which includes an amplifier 59 and an amplitude controlled feedback network 56 for returning a portion of the output voltage or current of amplifier 59 to the input of amplifier 59 with the phase needed for damping or oscillation. Lead 42 is provided to amplifier 59 whose output is electrically connected by lines 60 and 57 to the amplitude controlled feedback network 56. The output of amplitude controlled feedback network 56 is returned to the input of amplifier 59 by line 58 and to coil 40 by line 42. The amplitude controlled feedback network is also controllable by control 54 via line 55. An output of oscillator 50 is provided by line 53 to counter 52.

The circuit of FIG. 3 is functional for damping or enhancing oscillation of the magnetic field between first magnet 24 and second magnet 26. Movement of second magnet 26 relative to first magnet 24 causes a change of magnetic flux through the coil and induces a proportional voltage across the coil which is provided, as described above, to amplifier 59. Similarly, current applied through the coil will induce a magnetic field which will affect the force on the movable second magnet 26. Consequently, if a current proportional to the induced voltage across the coil is passed through the coil, the relative motion of first magnet 24 and second magnet 26 will be damped or enhanced depending upon the relative polarity of the current and voltage. In operation, damping is used to quieten the unit and then positive feedback is employed to develop a small and controlled level of oscillation at the natural frequency of magnetic vibrator 21, which as shown in the VERIFICATION below is proportional to gravity g. The natural frequency is detected by counter 52.

To further illustrate the invention, the following verification is provided.

VERIFICATION

Figure 4:
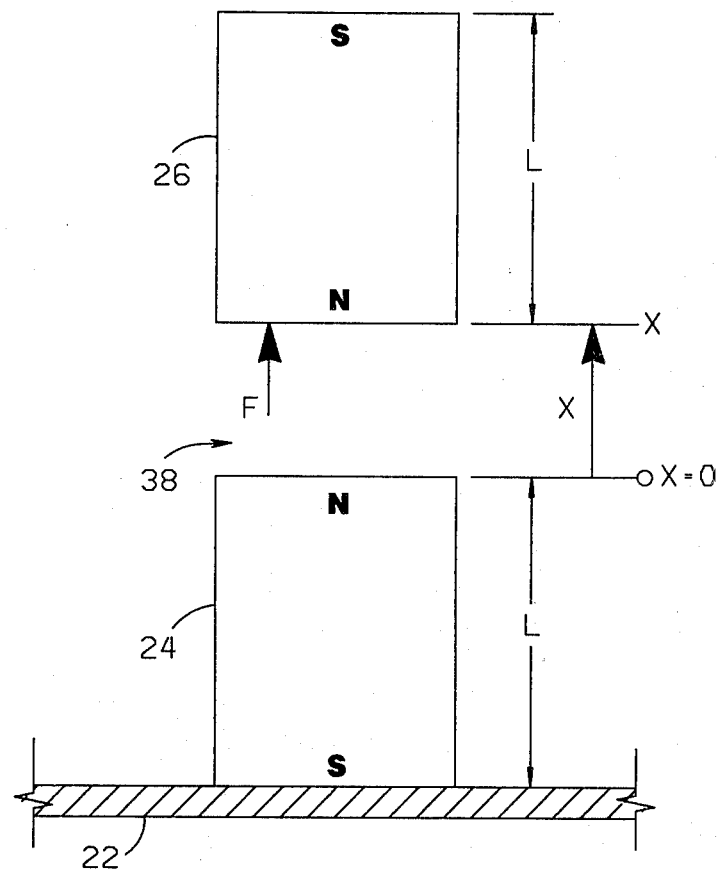
FIG. 4 illustrates, by way of example, certain principles of the invention.

Referring now to FIG. 4, FIG. 4 illustrates certain functional relationships in accordance with the invention. FIG. 4 illustrates first magnet 24 mounted on platform 22 and separated by a space 38 characterized by variable distance x therebetween varying between $x=0$ and $x=x_o$ responsive to changes in gravity g. L, which is much greater than x, is the respective length of each of the two magnets 24 and 26 having essentially dipolar magnetic fields and of equal field strengths.

Letting N, S be magnetic field strengths corresponding to $\Phi$, then the force F acting upward on magnet 26 due to the vertically opposed magnetic field is given by $$F = K_1 \left( \frac{N \cdot N}{x^2} + \frac{S \cdot S}{(x + 2L)^2} - \frac{2 S \cdot N}{(x + L)^2} \right)$$

where $K_1$ is a proportionality constant.
Since $L >> x$, $$F \cong K/x^2.$$

The force downward $f_d$ due to weight is given by $$f_d = w = mg$$

where w is the weight of magnet 26, m is the mass of magnet 26, and g is the accelertion due to gravity; and the sum of forces $\Sigma f$ acting on magnet 26 is given by $$\Sigma f = F - f_d = \frac{K}{x^2} - mg = m\ddot{x}. \quad (1)$$

Letting $x = (x_o + \delta)$ where $\delta << x$.

then $\frac{dx}{dt} = \frac{d\delta}{dt}$ and $\frac{d^2x}{dt^2} = \frac{d^2\delta}{dt} = \ddot{\delta}$.

Substituting into (1), $$\Sigma F = \frac{K}{x_o^2 + 2x_o\delta + \delta^2} - mg = m\ddot{\delta},$$

or $$\Sigma f = \frac{K/x_o^2}{1 + 2\delta/x_o + (\delta/x_o)^2} - mg = m\ddot{\delta}.$$

Since $\delta << x_o$, $$\Sigma f = \frac{K/x_o^2}{1 + 2\delta/x_o} - mg = m\ddot{\delta}.$$

For small oscillations, that is, for $\delta << x_o$, the solution for the natural frequency w is $$\omega = \sqrt{2} \left( \frac{m}{K} \right)^{\frac{1}{4}} g^{\frac{3}{4}}$$

or $\omega = R \cdot g^{\frac{3}{4}}$, where $R = \sqrt{2} \; (m/K)^{\frac{1}{4}}$ and $(d\omega/\omega) = \frac{3}{4}(dg/g)$.

Thus, assuming the magnetic fields of magnets 24 and 26 are equal, the natural frequency of oscillation is equal to a constant times gravity g to the three-fourths power. For small changes in g, as in a geophysical context, the magnetic vibrator 21 has a natural frequency of oscillation which is directly proportional to the acceleration of gravity raised to the three-fourths power.

Thus, applicant has discovered that the natural frequency of oscillation of a magnetic vibrator for small displacement oscillation is related to the magnitude of the acceleration of gravity at the location of the magnetic vibrator. The magnetic vibrator comprises, in a preferred embodiment, a pair of magnets positioned such that an upper magnet is hinged on a lever arm and is free to move vertically directly over a lower magnet which is fixed to a base plate. The magnets are placed with opposing magnetic fields so that under mechanical equilibrium conditions a gap exists between the two magnets, the size of which is directly proportional to the magnetic field strengths and inversely proportional to the square root of the product of the mass of the upper magnet system and the acceleration of gravity at the location of the upper magnet. Such a system has a natural frequency of oscillation which is directly proportional to the acceleration of gravity raised to the three-fourths power. This result allows the acceleration of gravity to be determined by means of a direct measurement of the small signal natural oscillating frequency of the magnetic vibrator described above. There are a variety of techniques that can be used to cause the described system to oscillate. The preferred technique by the Applicant comprises, as described above, the placing of an electrically conductive coil within the gap between the two magnets and modulating the intensity of the magnetic field in the gap by means of an external electronic oscillator connected to the coil. By using a magnetic or capacitive pickup to sense the actual mechanical vibrations and to transfer an electronic signal representative thereof back to the feedback network of the electronic oscillator, the entire electromechanical system is caused to vibrate at the above-mentioned natural frequency of oscillation. By monitoring this frequency with an electronic counter, the accleration of gravity at the location of the system can be readily determined.

The invention can offer significant advantages because (1) the base mode of oscillation (torsional) can be easily isolated from other modes of oscillation; (2) use of zero temperature coefficient of expansion magnets can minimize concerns about temperature variations encountered, for example, in borehole environments, and (3) it appears unlikely that high energy magnets such as preferentially employed according to the invention will exhibit "slip" resulting in frequency changes.

While the invention has been described in terms of preferred embodiments as required, the invention is not limited thereto but by the claims appended hereto.

What is claimed is:

1. Apparatus for determining the magnitude of the accleration of gravity at a location comprising:
   a magnetic shield;
   a temperature controlled housing;
   a first magnet having a generally dipolar magnetic field;
   a second magnet having a generally dipolar magnetic field;
   support means for vertically supporting in a substantially vertical gravity field within the temperature controlled housing and within the magnetic shield the first magnet and the second magnet with opposed magnetic poles so as to form a magnetic vibrator;
   first means for maintaining oscillation at a natural frequency of the magnetic vibrator formed by the first magnet and the second magnet in the substantially vertical gravity field, the natural frequency being representative of the acceleration of gravity at a location; and
   second means responsive to said oscillation for generating a signal correlated to the natural frequency.

2. Apparatus as in claim 1 wherein:
   the opposed magnetic poles effects a variable space between a pole of the first magnet and a corresponding pole of the second magnet; and wherein the first means further comprises:
   a coil mounted in the variable space;
   oscillator means electrically connected to the coil for maintaining the magnetic vibrator in oscillation at the natural frequency; and wherein
   the second means comprises counter means having an electrical input from the oscillator means for determining the natural frequency.

3. Apparatus as in claim 2 wherein:
   the first means further comprises means for selectively damping and enhancing oscillation of the oscillating magnetic vibrator.

4. Apparatus as in claim 2 wherein:
   the first magnet and the second magnet are magnets having a low temperature coefficient of expansion.

5. Apparatus as in claim 4 wherein:
   the magnets have substantially zero coefficient of expansion to over 200° C.

6. Apparatus as in claim 1 wherein:
   the support means permits oscillation with only one degree of freedom in the direction of the substantially vertical gravity field.

7. Apparatus as in claim 6 wherein:
   the first means and the second means are mounted in a gravity sonde adapted to be used in a remote location.

8. Apparatus as in claim 2 wherein:
   the first magnet and the second magnet are disk magnets each having a vertical axis aligned with the vertical gravity field; and
   the coil has a vertical axis substantially coaxial with the vertical axis of the vertical gravity field.

9. Method for determining the magnitude of the acceleration of gravity at a location comprising:
   maintaining oscillation at a natural frequency of a magnetic vibrator formed by magnets having vertically opposed magnetic poles in a substantially vertical gravity field, the natural frequency being representative of the acceleration of gravity at a location;
   generating a signal correlated to said oscillation.

10. Method as in claim 9 comprising:
    damping oscillation of the magnetic vibrator;
    thereafter enhancing and maintaining oscillation of the magnetic vibrator at the natural frequency; and
    determining the natural frequency from said signal.

* * * * *